United States Patent
Aguaviva et al.

(10) Patent No.: US 7,778,800 B2
(45) Date of Patent: Aug. 17, 2010

(54) METHOD AND SYSTEM FOR CALCULATING PERFORMANCE PARAMETERS FOR A PROCESSOR

(75) Inventors: Raul Aguaviva, London (GB); Jeffrey T. Kiel, Raleigh, NC (US); Sebastien Julien Domine, San Jose, CA (US); William Orville Ramey, II, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 99 days.

(21) Appl. No.: 11/497,863

(22) Filed: Aug. 1, 2006

(65) Prior Publication Data
US 2008/0033696 A1 Feb. 7, 2008

(51) Int. Cl.
*G06F 19/00* (2006.01)
(52) U.S. Cl. .................................... 702/185
(58) Field of Classification Search ........... 702/18–185, 702/188
See application file for complete search history.

(56) References Cited

U.S. PATENT DOCUMENTS

| | | | |
|---|---|---|---|
| 5,643,086 A | 7/1997 | Alcorn et al. | |
| 5,752,062 A | 5/1998 | Gover et al. | |
| 5,757,919 A | 5/1998 | Herbert et al. | |
| 5,815,154 A | 9/1998 | Hirschtick et al. | |
| 5,978,484 A | 11/1999 | Apperson et al. | |
| 6,016,474 A | 1/2000 | Kim et al. | |
| 6,157,618 A * | 12/2000 | Boss et al. | 370/252 |
| 6,330,008 B1 | 12/2001 | Razdow et al. | |
| 6,362,825 B1 | 3/2002 | Johnson | |
| 6,668,325 B1 | 12/2003 | Collberg et al. | |
| 6,732,060 B1 | 5/2004 | Lee | |
| 6,901,582 B1 | 5/2005 | Harrison | |
| 6,943,800 B2 | 9/2005 | Taylor et al. | |
| 7,047,519 B2 | 5/2006 | Bates et al. | |
| 7,095,416 B1 | 8/2006 | Johns et al. | |
| 7,107,484 B2 | 9/2006 | Yamazaki et al. | |
| 7,173,635 B2 | 2/2007 | Amann et al. | |
| 7,237,151 B2 | 6/2007 | Swoboda et al. | |
| 7,260,066 B2 | 8/2007 | Wang et al. | |
| 7,277,826 B2 | 10/2007 | Castelli et al. | |
| 7,383,205 B1 | 6/2008 | Peinado et al. | |
| 7,395,426 B2 | 7/2008 | Lee et al. | |

(Continued)

OTHER PUBLICATIONS gDEBugger, graphicRemedy, http://www.gremedy.com, Aug. 8, 2006.

(Continued)

*Primary Examiner*—Edward Raymond

(57) ABSTRACT

A method of calculating utilization and bottleneck performance parameters of a processing unit within a graphical processing unit (GPU). The utilization is a measure of a percentage that the processing unit is utilized over a draw call execution time. The bottleneck is the sum of the time period that the processing unit is active, the time period that the processing unit is full and does not accept data from an upstream processing unit, minus the time period that the processing unit is paused because the downstream processing unit is busy and cannot accept data, all over the execution time of the draw call. Performance parameters may be determined by sampling the processing unit and incrementing a counter when a condition is true. The method is repeated for the same draw call, for each processing unit of the GPU, and for a plurality of draw calls comprising a frame.

20 Claims, 6 Drawing Sheets

U.S. PATENT DOCUMENTS

| | | |
|---|---|---|
| 7,420,563 B2 | 9/2008 | Wakabayashi |
| 7,505,953 B2 | 3/2009 | Doshi |
| 7,555,499 B2 | 6/2009 | Shah et al. |
| 2001/0044928 A1 | 11/2001 | Akaike et al. |
| 2002/0157086 A1 | 10/2002 | Lewis et al. |
| 2003/0043022 A1 | 3/2003 | Burgan et al. |
| 2003/0214660 A1 | 11/2003 | Plass et al. |
| 2004/0085894 A1 | 5/2004 | Wang et al. |
| 2004/0130552 A1 | 7/2004 | Duluk, Jr. et al. |
| 2005/0222881 A1 | 10/2005 | Booker |
| 2005/0243094 A1 | 11/2005 | Patel et al. |
| 2005/0273652 A1 | 12/2005 | Okawa et al. |
| 2005/0278684 A1 | 12/2005 | Hamilton et al. |
| 2006/0079333 A1 | 4/2006 | Morrow et al. |
| 2006/0080625 A1 | 4/2006 | Bose et al. |
| 2006/0109846 A1 | 5/2006 | Lioy et al. |
| 2006/0161761 A1 | 7/2006 | Schwartz et al. |
| 2006/0185017 A1 | 8/2006 | Challener et al. |
| 2007/0115292 A1 | 5/2007 | Brothers et al. |
| 2007/0274284 A1 | 11/2007 | Dendukuri et al. |
| 2008/0007563 A1 | 1/2008 | Aronson et al. |
| 2008/0095090 A1 | 4/2008 | Lee et al. |

OTHER PUBLICATIONS

Duca et al.; A Relational Debugging Engine for the Graphics Pipeline; International Conference on Computer Graphics and Interactive Techniques; ACM SIGGRAPH 2005; pp. 453-463; ISSN:0730-0301.

"maxVUE Graphic Editor", Metso Automation, 2005, pp. 1-6, http://www.metsoautomation.com/automation/indes.nsf/FR?Readform&ATL=automation/ed_prod.nsf/WebWID/WTB-041110-22256F-2445A; eHB.

"Ati Radeon X800, 3D Architecture White Paper", ATI, 2005, pp. 1-13, with proof of seniority (4pages), according to ACM bibliography regarding the document: "The Direct3D 10 system", ACM TOG, vol. 25, Iss.3 (Jul. 2006), Reference 1; eHG.

N. Tatarchuk, "New RenderMonkey Features for DirectX and OpenGL Shader Development", Game Developers Conference, Mar. 2004.

C. Cebenoyan and M. Wloka, "optimizing the graphics pipeline", 2003, Nvidia GDC Presentation Slide.

gDEBugger, graphicREMEDY, http://www.gremedy.com/, Jul. 29, 2005.

\* cited by examiner

300

400

METHOD AND SYSTEM FOR CALCULATING PERFORMANCE PARAMETERS FOR A PROCESSOR

TECHNICAL FIELD

The present invention relates to the field of processors. More particularly, embodiments of the present invention relate to a method and system for calculating performance parameters for a processor.

BACKGROUND ART

In recent years, graphical processing units (GPUs) that are in general pipelined have substantially increased in complexity. As a result, the increase in complexity has lead to an increase in difficulty in determining the performance characteristics of the GPU. Accordingly, achieving optimal performance out of a GPU has become a daunting task due to the growing complexity in design and an increase in difficulty of determining its performance characteristics. Since a pipeline GPU runs only as fast as its slowest processing unit, it is important to identify and address the slower stages of the pipeline in order to improve the GPU efficiency and improve its frame rate.

In general, details of an application being executed on a GPU and its performance are hidden from the user in order to protect the manufacturers' proprietary information. On the other hand, providing detailed information of an application executing on the GPU and its performance allows software developers to improve the efficiency of the program. Accordingly, there is a tradeoff between protecting the proprietary information of the manufacturer of the GPU and improving the performance of the GPU and its corresponding frame rate.

In order to identify performance of a GPU a targeted experimentation may be performed. Targeted experimentation includes increasing and decreasing the workload at different processing units within the GPU pipeline. However, varying the workload at different processing units not only impacts the particular unit under test but it also impacts other processing units within the GPU pipeline. In other words, since most of the processing units of the GPU are interdependent, varying the workload of one processing unit impacts not only the performance of that unit but other units as well. Accordingly, impacting one processing unit ripples through the entire GPU pipeline.

As such, it is a difficult task to isolate a particular processing unit within the GPU pipeline by merely varying the workload. Moreover, there is a tradeoff between exposing internal GPU information/performance data and improving the frame rate.

SUMMARY

Accordingly, a need has risen to provide a method and a system to isolate a particular processor subunit within the GPU pipeline in order to calculate the performance information of the processor subunit while protecting the manufacturer's proprietary information. It will become apparent to those skilled in the art after reading the detailed description of the present invention that the embodiments of the present invention satisfy the above mentioned needs.

In one embodiment of the present invention, a method of calculating performance parameters (e.g., a utilization parameter or a bottleneck parameter) for subunits of a GPU pipeline is provided. In rendering a frame of an application, the GPU pipeline executes multiple draw calls.

A utilization parameter for a processor subunit is a measure of a percentage that a particular processor subunit is utilized over the duration of the draw call. In one embodiment, the utilization of a particular processor subunit may be determined by sampling the activity of that particular processor subunit during the execution of the draw call. As such, every time that the processor subunit is active during sampling, a counter may be incremented. Accordingly, dividing the parameter stored in the counter by the total number of times the subunit was sampled over the time of the draw call provides the utilization parameter of that particular processor subunit. This process may be repeated for a plurality of draw calls which comprise a frame. Moreover, this process may be repeated for each processor subunit within the GPU to provide the utilization parameter for each processor subunit. Furthermore, the process may be repeated for the same draw call in order to provide a more statistically accurate utilization parameter for each processor subunit. The counters may be stored within each processor subunit, accumulated together or reside in software.

The bottleneck parameter for a particular processor subunit is a measure of when that particular processor subunit is causing delay in data flow within the GPU pipeline. In one embodiment of the present invention, the bottleneck parameter of the processor subunit within the GPU pipeline is calculated by adding the time over which the processor subunit pauses an upstream processor unit because the processor subunit is busy and will not accept new data, to the time over which the processor subunit is actively processing data, minus the time over which the processor subunit is paused itself because a downstream unit is busy and does not accept further data, all divided by the time duration for the GPU to complete the draw call. The respective time to calculate the bottleneck parameter may be measured by sampling, incrementing and storing the information in a counter. This process may be repeated for a plurality of draw calls which comprise a frame. Moreover, this process may be repeated for each processor subunit within the GPU to provide the bottleneck parameter for each processor subunit. Furthermore, the process may be repeated for the same draw call in order to provide a more statistically accurate bottleneck parameter for each processor subunit.

As a result of employing the embodiments of the present invention, a processor subunit may be isolated such that the performance parameters of the processor subunit within a GPU pipeline can be calculated. The computations may become very accurate by computing the parameters for each subunit using the same frame data. Moreover, employing the embodiments of the present invention enables calculation of performance information of the processor subunit within a GPU pipeline while protecting the proprietary information of the manufacturer. Accordingly, the performance information may be used to optimize the execution of an application of the GPU and thereby increase its frame rate.

More specifically, an embodiment of the present invention pertains to a method of calculating performance parameters for a processor comprising a plurality of processor units, the method includes executing an executable task on the processor wherein the executable task is executed over a first period of time; during the executing, measuring a second period of time which is a duration of activity for one processor unit of the plurality of processor units; and based on the first and second periods of time, computing and storing a utilization parameter for the one processor unit and associating the utilization parameter with the executable task.

Embodiments include the above and wherein the processor is a pipeline graphical processing unit (GPU) and wherein further the executable task is a draw call executed on said GPU. Moreover, embodiments further include the above and wherein the utilization parameter is a measure of a percentage that the one processor unit is utilized over the draw call. Embodiments include the above and wherein the method is performed over a plurality of draw calls which comprise a frame. Additionally, embodiments include the above and wherein the measuring a second period of time is performed using a counter associated with the one processor unit. The embodiments also include the above and wherein the utilization parameter is computed by querying a counter of the one processor unit and wherein the one processor unit is sampled over the first period of time, and wherein the counter is incremented when the one processor unit is active. Furthermore, the embodiments include the above and wherein the process is repeated for each processor unit of the plurality of processor units to compute a respective utilization parameter for each processor unit.

Embodiments of the present invention further pertain to a method of calculating performance parameters for a processor comprising a plurality of processor units, the method includes executing an executable task on the processor wherein the executable task is executed over a first period of time; during the executing, measuring a second period over which one processor unit of the plurality of processor units is active over the first period of time; during the executing, measuring a third period of time over which the one processor unit pauses an upstream processor unit because the one processor unit is busy; during the executing, measuring a fourth period of time over which the one processor unit is paused because a downstream processor unit is busy and does not accept further data; and based on the first, second, third and fourth periods of time, computing and storing a bottleneck parameter for the one processor unit and associating the bottleneck parameter with the executable task.

Embodiments include the above and wherein the bottleneck parameter is based on the second time plus the third time minus the fourth time, all divided by the first time. Embodiments further include the above and wherein the processor is a pipeline graphical processing unit (GPU) and wherein further the executable task is a draw call executed on the GPU. Embodiments also include the above and wherein the steps are repeated for a plurality of draw calls which comprise a frame. Moreover, embodiments include the above and wherein the process is repeated on each processor unit of the plurality of processor units to compute a respective bottleneck parameter for each processor unit.

Furthermore, embodiments include the above and wherein the measuring a second period of time is performed using a first counter associated with the one processor unit, and wherein the measuring a third period of time is performed using a second counter associated with the one processor unit, and wherein the measuring a fourth period of time is performed using a third counter associated with the one processor unit. Additionally, embodiments include the above and wherein the one processor is sampled over the first period of time and the first counter incremented when the one processor unit is active, and wherein the one processor is sampled over the first period of time and the second counter incremented when the one processor unit pauses an upstream processor unit because the one processor unit is busy, and wherein the one processor is sample over the first period of time and the third counter incremented when the one processor unit is paused because the downstream processor unit is busy and does not accept further data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
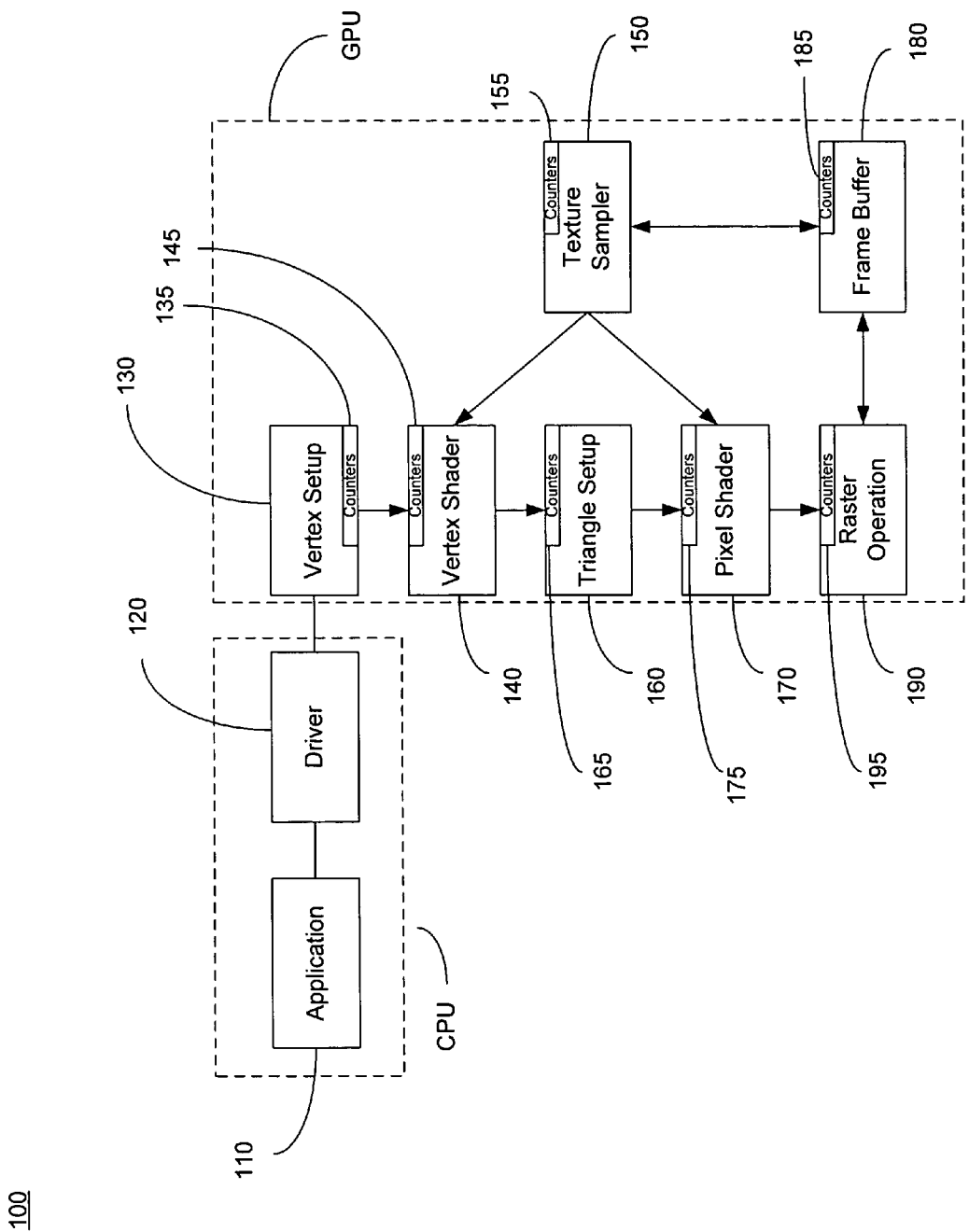
FIG. 1 shows an exemplary computer system in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "calculating" or "measuring" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A Method and System for Calculating Performance Parameters for a Processor

A method and system for calculating performance parameters are important in isolating a problematic processor subunit of a processor pipeline for a particular graphics application. Accordingly, upon determining the problematic processor subunit, corrective actions may be taken in order to optimize the performance of the processor subunit and improve the frame rate of the application. For example, calculating a utilization parameter and the bottleneck information for each processing subunit may allow software developers to optimize their code such that each processor subunit is utilized more and bottlenecks in the processing pipeline are reduced. It is appreciated that while a graphics processor is used as an illustration, the present invention may be utilized on any microprocessor having subunits, functional units, logic units, etc.

Referring now to FIG. 1 an exemplary computer system 100 in accordance with one embodiment of the present invention is shown. In general, the pipeline processor subunit of a computer system can be divided into two parts, a central processing unit (CPU) and a GPU.

The CPU may include a resident memory application 110 coupled to a driver 120. The application 110 is a program resident in memory and being executed by the CPU. For example, the application 110 may be a graphics application (e.g., a computer game), or other application such as a word editing software, an electronic mail (email) program, or a web browser program to name a few. The application 110 executed by the CPU may need a driver 120 in order to be executed. For example, an audio file may require a specific driver based on its format in order to be executed properly.

The driver 120 dispatches draw call commands to the GPU for execution.

Multiple draw call commands are used to assemble a frame of data in the frame buffer 180. Draw calls are well known. Embodiments of the present invention can associate a subunit performance parameter with a particular draw call.

In general, a GPU includes a number of functional units operating in parallel in a pipeline fashion, which can be viewed as separate special processors coupled together in locations where a bottleneck can occur. These separate special processors where a bottleneck can occur include a vertex setup 130, a vertex shader 140, a triangle setup 160, a pixel shader 170, a raster operation 190, and a texture sampler 150, to name a few. The vertex setup 130 may be coupled to the vertex shader 140. The vertex 130 may also be coupled to and receive data from the CPU. The vertex shader 140 may be coupled to and receive data from the texture sampler 150. The vertex shader 140 may be coupled to and send data to the triangle setup 160 which may be in turn coupled to the pixel shader 170. The pixel shader 170 may further be coupled to and receive data from the texture sampler 150. The pixel shader 170 may be further coupled to and send data to the raster operation 190. The raster operation 190 may also be coupled to and receive data from the frame buffer 180. The frame buffer 180 may be coupled to the texture sampler 150 and receive data from the texture sampler 150. It is appreciated that the subunits shown in FIG. 1 are exemplary only to illustrate aspects of the present invention and that the embodiments of the present invention can be practiced on any processor having pipeline subunits.

Referring still to FIG. 1, each of the special processor subunits within the GPU pipeline is described. The vertex setup 130 fetches vertices and indices to assemble the fetched data and collect vertex format, normal, color, smoothing and other attributes. The performance of the vertex setup 130 can vary depending on where the actual vertices and indices are placed, which is in general from the system memory or from the local frame buffer memory. The vertex setup 130 may include a counter 135 that may store various data information. For example, the vertex setup 130 may be sampled during a draw call and the counter 135 may be incremented each time that the vertex setup 130 is active and is processing data. It is appreciated that even though the counter 135 is shown residing inside the vertex setup 130, it may alternatively reside outside of the unit or in software.

The vertex shader 140 is the transforming stage of the GPU pipeline where it receives a set of vertex attributes from the vertex setup 130 (e.g., model-space positions, vertex normals, texture coordinates, etc.) and the texture sampler 150, and produces a set of attributes suitable for clipping and rasterization (e.g., homogeneous clip-space position, vertex lighting results, texture coordinates, etc.). In other words, the vertex shader 140 runs a program on each vertex from a piece of geometry and as a result the object may be shrunk, expanded, and changed position, to name a few. In general, the performance of the vertex shader 140 is a function of the work done per vertex, along with the number of the vertices being produced. The vertex shader 140 may include a counter 145 that may store various data information. For example, the vertex shader 140 may be sampled during a draw call and the counter 145 may be incremented each time that the vertex shader 140 is active and is processing data. It is appreciated that even though the counter 145 is shown residing inside the vertex shader 140, it may alternatively reside outside of the unit or be resident in software.

In general, one method to draw an object is by defining a plurality of simple graphical objects (e.g., triangles). In order to define a triangle, three vertices of the triangle are needed to determine the perimeter of the triangle. As such, a processor subunit such as the triangle setup 160 may be used. It is appreciated that other similar units may be utilized. For example, a unit defining a polygon may be used instead of using the triangle setup 160. The triangle setup 160 may include a counter 165 that may store various data information. For example, the triangle setup 160 may be sampled during a draw call and the counter 165 may be incremented each time that the triangle setup 160 is active and is processing data. It is appreciated that even though the counter 165 is shown residing inside the triangle setup 160, it may alternatively reside outside of the unit or in software.

The pixel shader 170 is the processor subunit associated with color and depth value of an object. Therefore, the pixel shader 170 receives data from the triangle setup 160 and the texture sampler 150 and applies an appropriate color and depth value to the object by running the program on each pixel. The pixel shader 170 provides different lighting to the object being drawn (e.g., shiny, dull, and etc.). The pixel shader 170 may include a counter 175 that may store various data information. For example, the pixel shader 170 may be sampled during a draw call and the counter 175 may be incremented each time that the pixel shader 170 is active and is processing data. It is appreciated that even though the counter 175 is shown residing inside the pixel shader 170, it may alternatively reside outside of the unit or in software.

The raster operation 190 is responsible for reading and writing depth and stencil, comparing depth and stencil, reading and writing color as well as alpha blending and testing. For example, the raster operation 190 decides the amount of color being added. Much of the raster operation 190 workload taxes the available frame buffer 180 bandwidth. Accordingly, in one embodiment of the present invention to determine whether the application is frame-buffer bandwidth-bound is to vary the bit depths of the color and/or depth buffers. If reducing the bit depth significantly improves the performance then the frame buffer 180 is bandwidth bound. The raster operation 190 may include a counter 195 that may store various data information. For example, the raster operation 190 may be sampled during a draw call and the counter 195 may be incremented each time that the raster operation 190 is active and is processing data. It is appreciated that even though the counter 195 is shown residing inside the raster operation 190, it may alternatively reside outside of the unit or in software.

The texture sampler 150 may provide high dynamic lighting support to other processor subunits such as the vertex shader 140 and the pixel shader 170, to name a few. Moreover, the texture sampler 150 may be used to minimize extraneous memory requests. The texture sampler 150 may include a counter 155 that may store various data information. For example, the texture sampler 150 may be sampled during a draw call and the counter 155 may be incremented each time that the texture sampler 150 is active and is processing data. It is appreciated that even though the counter 155 is shown residing inside the texture sampler 150, it may alternatively reside outside of the unit or in software.

The frame buffer 180 may provide additional support for special effects such as motion blur and explosions or simply cache data, to name a few. Additionally, the frame buffer 180 stores pixel information. The frame buffer 180 may include a counter 185 that may store various data information. For example, the frame buffer 180 may be sampled during a draw call and the counter 185 may be incremented each time that the frame buffer 180 is active and is processing data. It is appreciated that even though the counter 185 is shown residing inside the frame buffer 180, it may alternatively reside outside of the unit or in software.

Figure 2:
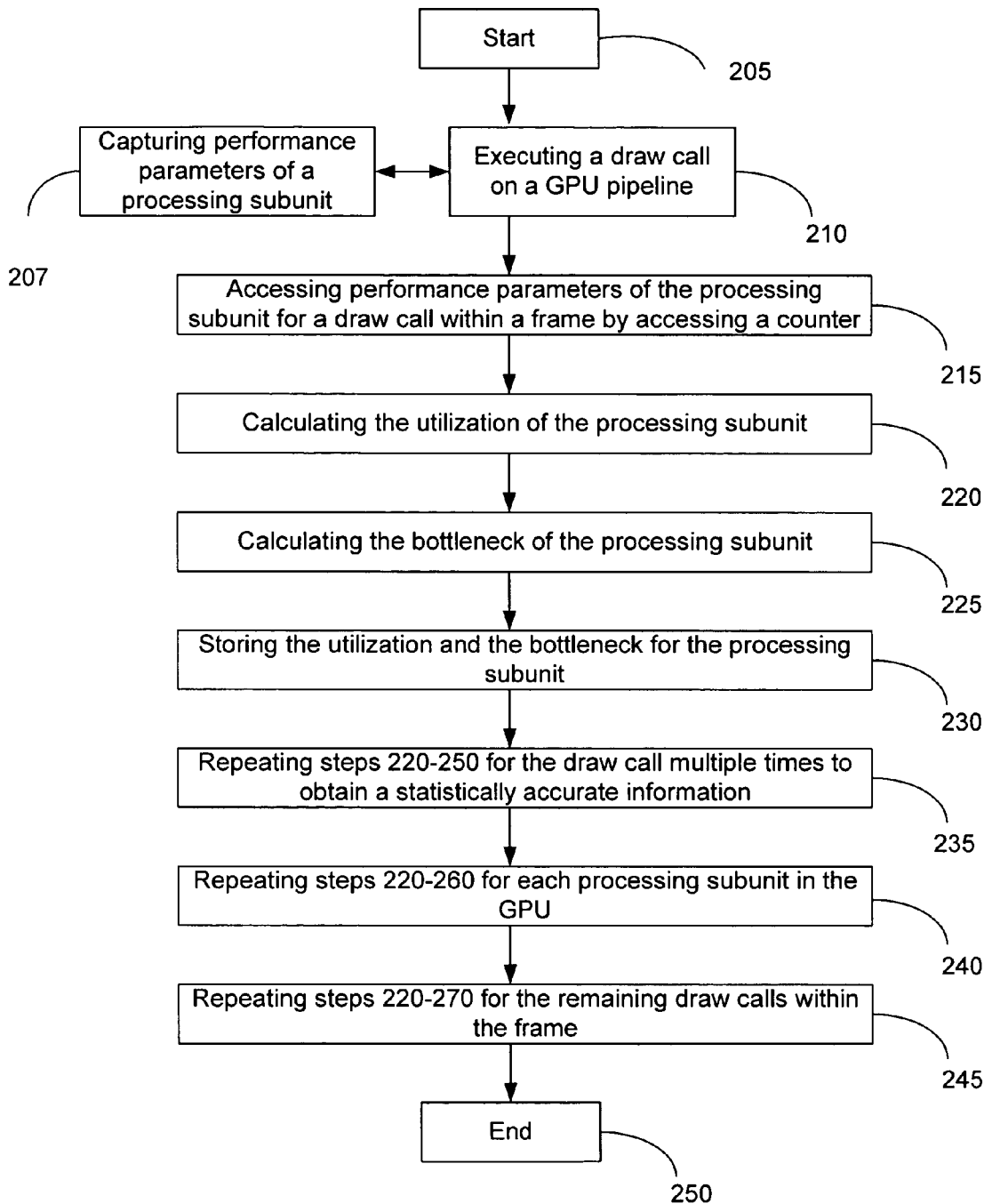
FIG. 2 shows a flow diagram of a computer implemented process for calculating the performance parameters of a GPU pipeline in accordance with one embodiment of the present invention.

Referring now to FIG. 2, a flow diagram of a computer implemented process 200 for calculating subunit performance parameters in accordance with one embodiment of the present invention is shown. It is appreciated that the steps shown are exemplary and not intended to limit the scope of the present invention.

Process 200 starts at step 205. A draw call is sent to the GPU. A frame may include a plurality of draw calls. The draw call is executed by the GPU at step 210. For example, the draw call is executed by the processor subunits in the GPU pipeline (e.g., the vertex setup 130, the vertex shader 140, the triangle setup 160, the texture sampler 150, the pixel shader 170, the raster operation 190, and the frame buffer 180). During execution of the draw call, various values and data information may be stored in a counter within the GPU pipeline (e.g., counters 135, 145, 155, 165, 175, 185, and 195). For illustration purposes, the calculation of the performance parameters of the pixel shader 170 processor subunit are discussed. Accordingly, the draw call is executed by the GPU pipeline including the pixel shader 170 processor subunit.

At step 207, performance parameters on a processing subunit are captured.

In one embodiment of the present invention, the performance parameters for the processing subunit are captured while the draw call is being executed by that processing subunit. Accordingly, step 207 is shown parallel to that of step 210. The performance parameters include but are not limited to the amount of time the subunit is active, the amount of time the subunit is paused due to the downstream subunit being busy, the amount of time the subunit is busy and pauses the upstream subunit, and the amount of time needed for the draw call to be executed by the GPU pipeline.

At step 215, the performance parameters of the pixel shader 170 are accessed. The performance parameters are data information of the processor subunit under analysis (e.g., the pixel shader 170) for a particular draw call. A performance parameter may be the time which the pixel shader 170 is active and is processing data during the draw call. The performance parameters for a subunit may be stored in the counters 175.

At step 220, the utilization of the processor subunit (e.g., the pixel shader 170) for the particular draw call is determined from the performance parameters accessed at step 215. The utilization parameter is a measure of a percentage that a processor subunit is utilized over the execution time of the draw call. The utilization of a processor subunit is important because if a unit is not utilized 100% of the time, then that might indicate that the resources are being wasted. For example, if the pixel shader 170 is not 100% utilized, then that might suggest that there are unused resources allocated to the pixel shader 170. As such, in order to optimize resources and performance of the GPU pipeline, the amount of resources allocated to each unit may be adjusted based on the utilization calculated. The utilization parameter and its calculation are described in more detail below.

At step 225, the bottleneck for the processor subunit (e.g., the pixel shader 170) for the draw call is calculated based on the performance parameters accessed at step 215. The bottleneck occurs when a processor subunit does not have sufficient resources to handle the intake of data flow. As such, bottleneck in general leads to a slow down in data flow and data processing. Therefore, as discussed above, calculating the bottleneck for processor subunits in a GPU pipeline enables the software developers to determine problematic processor subunits. As such, corrective action may be taken in order to address the bottleneck problem at the processor subunit. The bottleneck parameter and its calculation are described in more detail below.

At step 230, the utilization parameter and the bottleneck parameter may be stored for each of the processor subunits and associated draw call for further analysis at a later time. In one embodiment, the utilization parameter and the bottleneck parameter associated with the draw call being executed by the processor subunit are stored in a table which may be in tabular format. At step 235, steps 210-230 are repeated for the same draw call for the same processing subunit in order to obtain a statistically accurate picture of the GPU pipeline. Moreover, executing the same draw call results in a more sophisticated performance calculation because the performance parameters in one embodiment are sample based. Furthermore, the same draw call is executed to maintain a constant workload to lead to a same result. Accordingly, executing the same draw call many times and analyzing the execution of the draw call over a same processor subunit results in a sophisticated analysis of the pipeline unit while using the limited number of counters present.

At step 240, steps 210-235 are repeated for each processor subunit within the GPU pipeline. Accordingly, a comprehensive performance of the GPU pipeline is calculated. As such, problematic processor subunits may be determined and addressed such that the performance of the GPU as a whole is improved which in turn improves the frame rate. At step 245, steps 210-240 are repeated for the remaining draw calls within the frame. Accordingly, executing different draw calls in the frame provide performance information for the entire frame and not just a single draw call. As such, problematic areas of a GPU pipeline over a wide range of draw calls may be determined. Therefore, optimizing and addressing the problematic processor subunit improves the performance of the GPU pipeline over a wide range of draw calls. At the computation of step 245, utilization parameters and bottleneck parameters for each draw call of the frame are computed. Also associated with each draw call is its execution time and numbers of pixel processed. The process ends at step 250.

Figure 3:
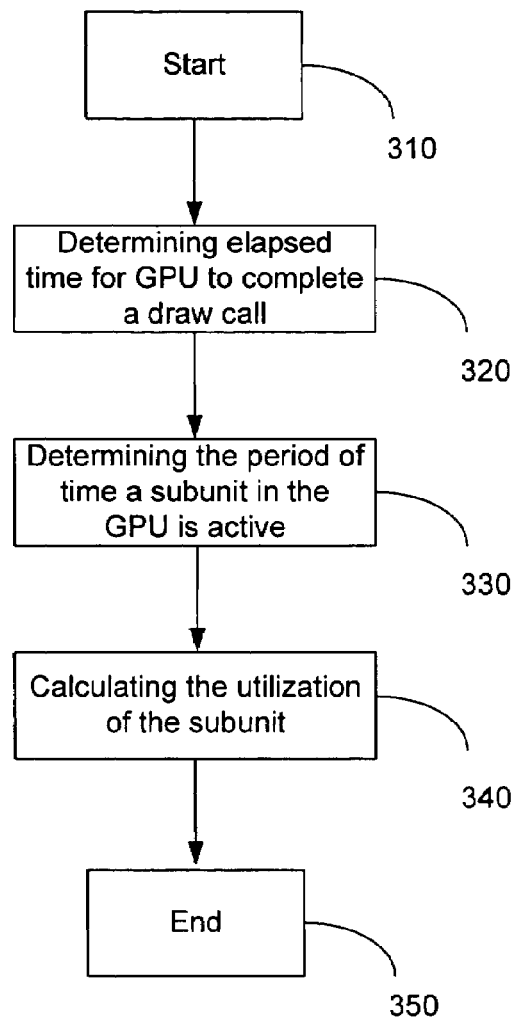
FIG. 3 shows a flow diagram of a computer implemented process for calculating the utilization of a processor subunit of a GPU pipeline in accordance with one embodiment of the present invention.

Referring now to FIG. 3, a method 300 for calculating the utilization discussed at step 220 of FIG. 2 is described in accordance with one embodiment of the present invention. At step 310, the process for calculating the utilization parameter for a processor subunit begins. As described above, utilization is a measure of a percentage that a processor subunit is utilized over a draw call. In one embodiment, utilization parameter of a processor subunit may be defined by the following equation:

$$\text{Utilization} = \frac{t_1}{t}$$

At step 320, the elapsed time for the GPU to complete the draw call is determined wherein the elapsed time is t in the equation presented above. For example, t is the time needed by the GPU in FIG. 1 to complete the draw call.

Once the time needed for the draw call to be executed by the GPU is determined, at step 330 the period of time that a unit in the GPU is active over the draw call (e.g., $t_1$) is determined. For illustration purposes, the utilization of the pixel shader 170 is calculated. Accordingly, the period during which the pixel shader 170 is active during execution of the draw call by the GPU is determined. In one embodiment, to determine the period that the processor subunit is active the processor subunit (e.g., the pixel shader 170) may be sampled. Accordingly, during the draw call an enable line of the processor subunit (e.g., the pixel shader 170) may be sampled and if the processor subunit (e.g., the pixel shader 170) is active, a counter (e.g., counter 175) is incremented. As such, querying the counter 175 provides the number of sample times which the pixel shader 170 has been active during the draw call. Knowing the sampling rate, the period of time which the pixel shader 170 has been active can be calculated. It is appreciated that elapsed time may be determined at any time. For example, the elapsed time may be determined during the sampling of the active signal or alternatively before or after the sampling of the active signal.

At step 340, the utilization of the processor subunit (e.g., the pixel shader 170) may be determined since the elapsed time for the GPU to complete the draw call and the period of time the unit (e.g., the pixel shader 170) in the GPU is active is known. For example, if the elapsed time for the GPU to complete the draw call is 20 ms and if the period of time that the pixel shader 170 is active is 8 ms, then the utilization of the pixel shader 170 is calculated to be 40%. This percentage is then stored in memory and is associated with the draw call and the subunits at step 350.

Figure 4:
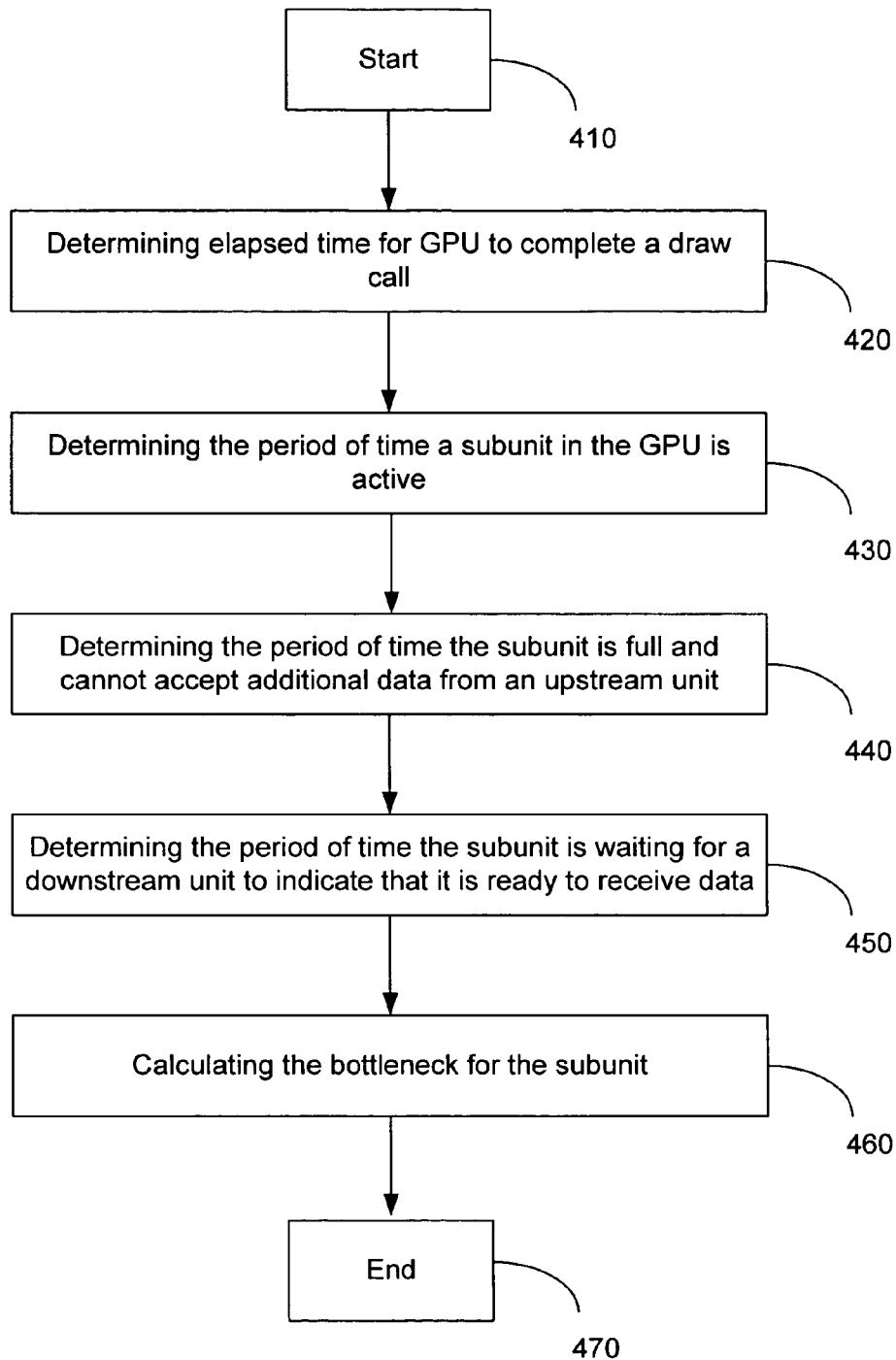
FIG. 4 shows a flow diagram of a computer implemented process for calculating the bottleneck of a processor subunit of a GPU pipeline in accordance with one embodiment of the present invention.

Referring now to FIG. 4, a flow diagram 400 for calculating the bottleneck parameter mentioned at step 225 of FIG. 2 is described in accordance with one embodiment of the present invention. At step 410, the process for calculating the bottleneck for a processor subunit begins. For illustration purposes, the bottleneck parameter of the pixel shader 170 is calculated. As described above, bottleneck occurs when a processor subunit does not have sufficient resources to handle the intake of data flow, therefore impeding the flow of data in and from other units. In one embodiment, bottleneck of a processor subunit may be defined by the following equation:

$$\text{Bottleneck} = \frac{t_1 + t_2 - t_3}{t}$$

At step 420, the elapsed time for the GPU to complete the draw call is determined wherein the elapsed time is t in the equation presented above. Determining time t has been described at step 320 above.

At step 430, the period of time that a unit (e.g., the pixel shader 170) in the GPU is actively accepting data is determined (e.g., $t_1$). The period of time that the pixel shader 170 is actively accepting data is determined by sampling the pixel shader 170 and if during sampling the pixel shader 170 is accepting data, the counter is incremented.

At step 440, the period of time that the processor subunit (e.g., the pixel shader 170) is full or busy and cannot accept additional data from an upstream unit is determined (e.g., $t_2$). Accordingly, the upstream unit (e.g., the triangle setup 160) is paused and stopped from sending additional data to the processor subunit (e.g., the pixel shader 170) because the pixel shader 170 is full and busy. One reason for the pixel shader 170 being busy may be that it is waiting for the texture unit 150 to produce some result. This demonstrates the subtle interrelation between subunits that can make bottleneck determination difficult. Therefore, experiments are run on related units to determine if there is a bottleneck caused by this type of side effect.

At step 450, the period of time that the processor subunit (e.g., the pixel shader 170) is paused and stopped from sending its processed data to its downstream processor subunit because the downstream subunit is busy (e.g., the raster operation 190) is determined (e.g., $t_3$). The pixel shader 170 may be paused due to the fact that the raster operation 190 is busy and full. Accordingly, even though the pixel shader 170 is impeding the flow of data from its upstream units (e.g., the triangle setup 160 and the texture sampler 150), the pause is due to the downstream unit, the raster operation 190. Accordingly, to account for situations like this, the period of time that the processor subunit is stopped because the downstream unit is full and busy is subtracted.

At step 460, the bottleneck of the processor subunit (e.g., the pixel shader 170) may be calculated since t, $t_1$, $t_2$ and $t_3$ are known. For example, for illustration purposes t may be 20 ms. Again similar to above, $t_1$ may be 8 ms. The period of time that the pixel shader 170 is full and cannot accept additional data from its upstream units, the texture sampler 150 and the triangle setup 160, may be determined to be 5 ms. Accordingly, $t_2$ is 5 ms. The period of time that the pixel shader is paused because its downstream unit, the raster operation 190, is full and busy is also determined (e.g., $t_3$ is 3 ms). Accordingly, the bottleneck of the pixel shader 170 is calculated to be 50%. At step 470, the computed bottleneck parameter is stored in memory and associated with the draw call and the subunit.

Figure 5:
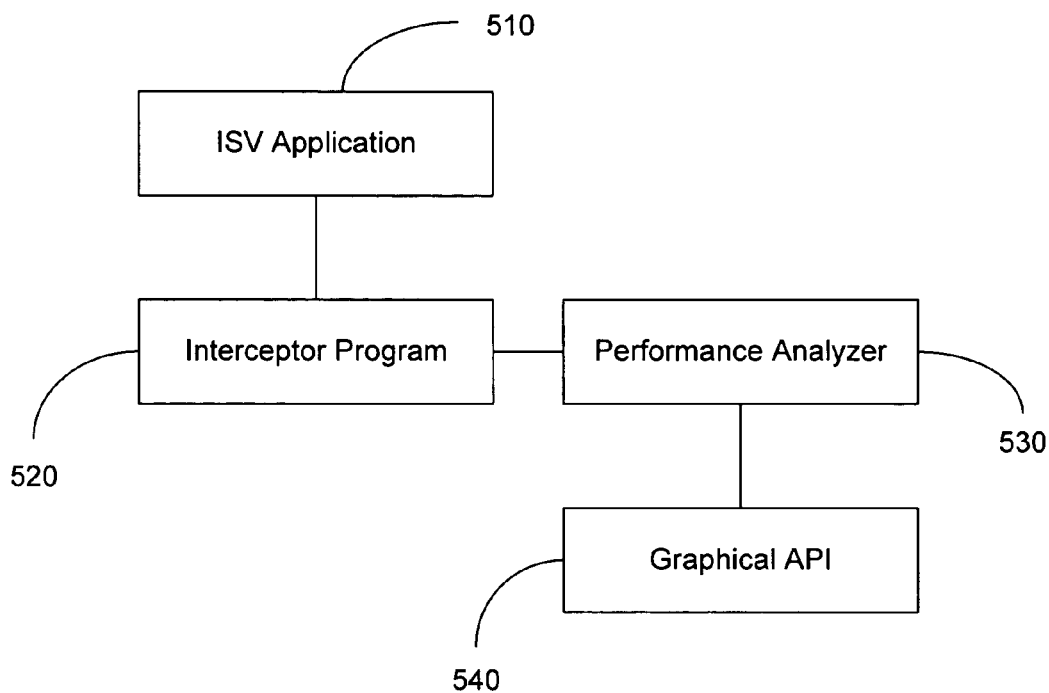
FIG. 5 shows an exemplary block diagram showing various software interactions in accordance with one embodiment of the present invention.

Referring now to FIG. 5, an exemplary software block diagram showing various software interactions in accordance with one embodiment of the present invention is shown. In one embodiment, the software developers may wish to calculate the performance of the GPU unit based on their particular program and software. ISV application 510 is the software program developed by the software developer and being executed. The above described parameters may be computed for a code sample of the application 510. For example, ISV application 510 may be a game developed by the developer. An interceptor program 520 intercepts the ISV application 510 being executed and causes the program to be executed by the GPU pipeline where a performance analyzer 530 can calculate the performance of the GPU pipeline as discussed above. The performance analyzer 530 is also in communication with a graphical API 540.

In order to calculate subunit performance, the same methods as above are employed except that the interceptor program 520 selects and runs the same frame repeatedly to obtain the statistical average performance. Accordingly, the interceptor 520 sends the same frame every time to the performance analyzer 530 by setting the delta time to zero and performance analyzer 530 calculates the utilization and bottleneck parameters.

Accordingly, using the methods described above not only provides the software developers a comprehensive calculation of the performance parameters of the GPU pipeline but also protects the proprietary information of the GPU manufacturer. For example, software developers have access to the final result of the performance analysis which is the utilization and the bottleneck parameters for each processor subunit. Accordingly, the proprietary information contained in the interworking of each processor subunit remains protected and not revealed. At the same time, software developers can optimize and improve the frame rate of their applications based on the utilization and bottleneck results provided.

For example, if the problematic unit is at the vertex setup unit 130, the software developer may reduce number of bytes used in the vertex format, generate potentially derivable vertex attributes inside the vertex program instead of storing them inside the input vertex format, reduce the size of the vertex indices used, or by accessing vertex data in a relatively sequential manner, thus improving cache efficiency. If the problematic unit is the vertex processing 140, the software developer may pull out per object computation onto the CPU, reduce the number of vertices processed, or use the correct coordinate space. If the problematic unit is the pixel shader 170, the software developer may render depth first, thus enabling and improving Z culling to reduce pixel processing, store complex functions in textures, avoid unnecessary normalization, use half precision operations, consider using pixel shader level-of-detail, or to make sure that the unit is not limited by the texture bandwidth 155.

If the problematic unit is the texture sampler 150, the software developer may reduce the size of the texture, use mipmapping on any surface that may be minified, compress all color textures, avoid expensive texture formats if not necessary, use appropriate anisotropic texture filtering levels, or disable trilinear filtering when unnecessary. Finally, if the problematic unit is the frame buffer 180 bandwidth, the software developer may render depth first, reduce alpha bending, turn off depth writes when possible, avoid extraneous color buffer clears, render front-to-back, optimize skybox rendering, only use floating point frame buffers when necessary, or reduce the bit depth and color when possible. It is appreciated that the optimizations discussed above may equally be applicable to a raster operation.

It is appreciated that the method described above may be extended to multiple processors/GPUs. Multiple processors/GPUs may be coupled in parallel or series or any combination thereof. Moreover, in one embodiment a frame comprising multiple draw calls may be divided such that different portions of a frame are executed by a different processor/GPU. Use of multiple processors/GPUs may additionally result in other complications. For example, a bottleneck may be created by one GPU pipeline and affect the performance of the remaining GPU pipelines. However, the method described above may be used to calculate the performance characteristics such as the utilization and the bottleneck.

Figure 6:
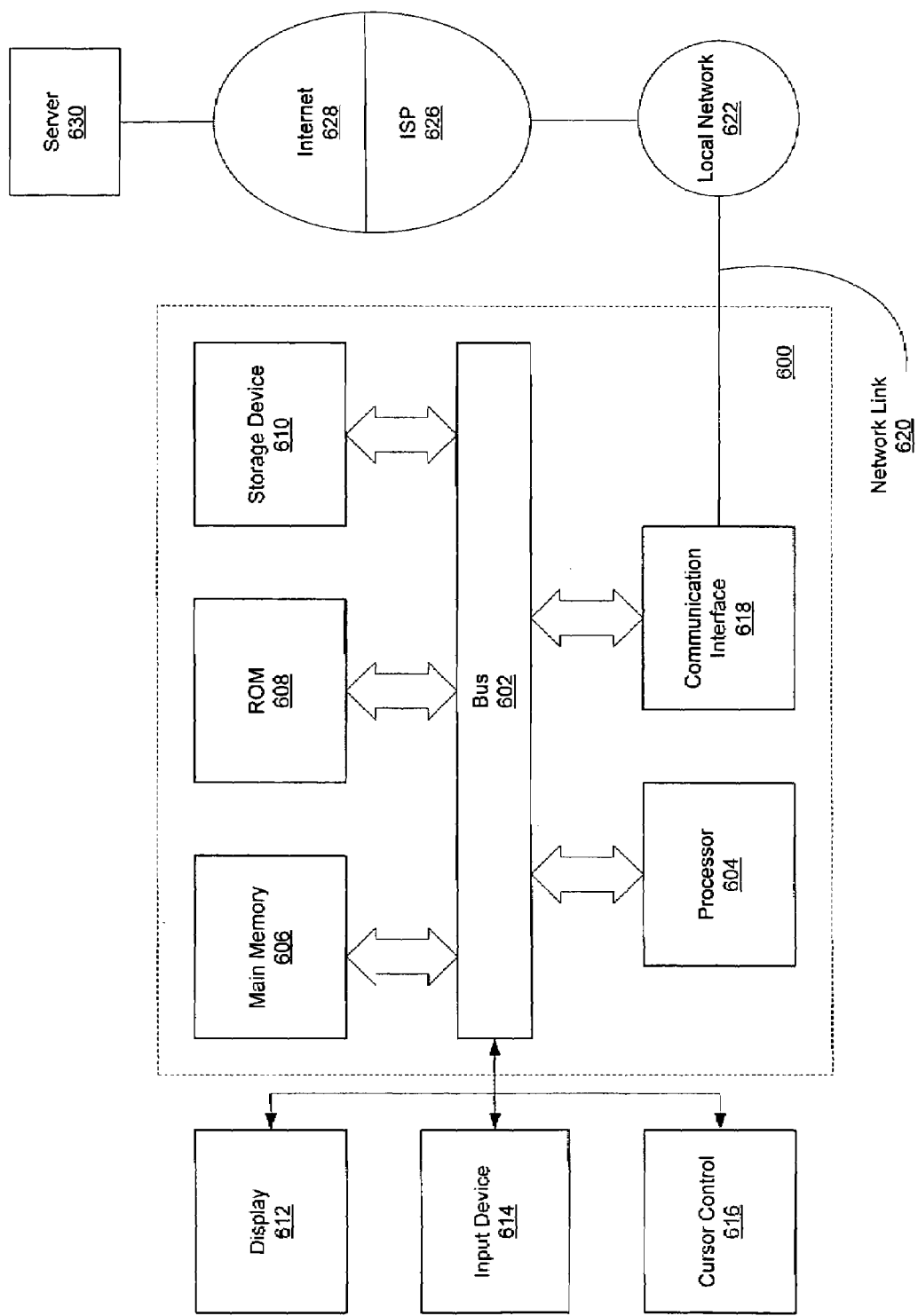
FIG. 6 illustrates a general purpose computer system that may serve as a platform for embodiments of the present invention.

FIG. 6 is a block diagram that illustrates a computer system 600 upon which an embodiment of the invention may be implemented. Computer system 600 may implement the method for calculating performance parameters as shown in FIGS. 2-5 and includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A non-volatile storage device 610, such as a magnetic disk or optical disk, is provided and coupled to bus 602 for storing information and instructions and may store the persistent internal queue.

Computer system 600 may be coupled via bus 602 to an optional display 612, such as a cathode ray tube (CRT), for displaying information to a computer user. An optional input device 614, including alphanumeric and other keys, may be coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Computer system 600 can send and receive messages through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of calculating performance parameters for a processor comprising a plurality of processor units, said method comprising:
   a) executing an executable task on said processor wherein said executable task is executed over a first period of time;
   b) during said executing, measuring a second period of time which is a duration of activity for one processor unit of said plurality of processor units; and
   c) based on said first and second periods of time, computing and storing a utilization parameter for said one processor unit and associating said utilization parameter with said executable task.

2. A method as described in claim 1 wherein said processor is a pipeline graphical processing unit (GPU) and wherein further said executable task is a draw call executed on said GPU.

3. A method as described in claim 2 wherein said utilization parameter is a measure of a percentage that said one processor unit is utilized over said draw call.

4. A method as described in claim 2 further comprising performing said a), b) and c) on a plurality of draw calls which comprise a frame.

5. A method as described in claim 1 wherein said measuring a second period of time is performed using a counter associated with said one processor unit.

6. A method as described in claim 1, wherein said utilization parameter is computed by querying a counter of said one processor unit.

7. A method as described in claim 6, wherein said one processor unit is sampled over said first period of time, and wherein said counter is incremented when said one processor unit is active.

8. A method of calculating performance parameters for a processor comprising a plurality of processor units, said method comprising:
   a) executing an executable task on said processor wherein said executable task is executed over a first period of time;
   b) during said executing, measuring a second period over which one processor unit of said plurality of processor units is actively processing data over said first period of time;
   c) during said executing, measuring a third period of time over which said one processor unit pauses an upstream processor unit because said one processor unit is busy;
   d) during said executing, measuring a fourth period of time over which said one processor unit is paused because a downstream processor unit is busy and does not accept further data; and
   e) based on said first, second, third and fourth period of time, computing and storing a bottleneck parameter for said one processor unit and associating said bottleneck parameter with said executable task.

9. A method as described in claim 8 wherein said bottleneck parameter is based on said second time plus said third time minus said fourth time, all divided by said first time.

10. A method as described in claim 8 wherein said processor is a pipeline graphical processing unit (GPU) and wherein further said executable task is a draw call executed on said GPU.

11. A method as described in claim 10 further comprising performing said a), b), c), d) and e) on a plurality of draw calls which comprise a frame.

12. A method as described in claim 8 wherein said measuring a second period of time is performed using a first counter associated with said one processor unit, and wherein said measuring a third period of time is performed using a second counter associated with said one processor unit, and wherein said measuring a fourth period of time is performed using a third counter associated with said one processor unit.

13. A method as described in claim 12, wherein said one processor is sampled over said first period of time and said first counter incremented when said one processor unit is active, and wherein said one processor is sampled over said first period of time and said second counter incremented when said one processor unit pauses an upstream processor unit because said one processor unit is busy, and wherein said one processor is sample over said first period of time and said third counter incremented when said one processor unit is paused because said downstream processor unit is busy and does not accept further data.

14. A method of calculating performance parameters for a processor comprising a plurality of processor units, said method comprising:
   a) executing an executable task on said processor, wherein said executable task is executed over a first period of time;
   b) during said executing, measuring first activity data pertinent to one processor unit of said plurality of processor units;
   c) during said executing, measuring second activity data pertinent to said one processor unit;
   d) based on said first activity data and said first period of time, computing and storing a utilization parameter for said one processor unit for said executable task; and
   e) based on said second activity data and said first period of time, computing and storing a bottleneck parameter for said one processor unit for said executable task.

15. A method as described in claim 14, wherein said processor is a pipeline graphical processing unit (GPU) and wherein further said executable task is a draw call executed on said GPU.

16. A method as described in claim 15 wherein said utilization parameter is a measure of a percentage that said one processor unit is utilized over said draw call.

17. A method as described in claim 15 further comprising performing said a), b), c), d) and e) on a plurality of draw calls which comprise a frame.

18. A method as described in claim 14 wherein said c) comprises:
- a) during said executing, measuring a second period of time over which said one processor unit of said plurality of processor units is active over said first period of time;
- b) during said executing, measuring a third period of time over which said one processor unit pauses an upstream processor unit because said processor unit is busy;
- c) during said executing, measuring a fourth period of time over which said one processor unit is paused because a downstream processor unit is busy and does not accept further data; and wherein said e) comprises:

computing said bottleneck parameter based on said second period of time plus said third period of time minus said fourth period of time, all divided by said first period of time.

19. A method as described in claim 14 wherein said measuring said first activity data and said second activity data is performed using a counter associated with said one processor unit.

20. A method as described in claim 14, wherein said b) comprises during said executing, measuring a second period of time over which said one processor unit of said plurality of processor units is active over said first period of time and wherein said d) comprises computing said utilization parameter by dividing said second period of time by said first period of time.

* * * * *